(12) United States Patent
Cuadra et al.

(10) Patent No.: US 8,791,746 B1
(45) Date of Patent: Jul. 29, 2014

(54) OVER-TEMPERATURE PROTECTION OF SEMICONDUCTOR COMPONENTS

(71) Applicant: Power Integrations, Inc., San Jose, CA (US)

(72) Inventors: Jason E. Cuadra, San Jose, CA (US); Hartley Fred Horwitz, Ottawa (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/828,160

(22) Filed: Mar. 14, 2013

(51) Int. Cl.
*H01L 35/00* (2006.01)

(52) U.S. Cl.
USPC .......................................................... 327/512

(58) Field of Classification Search
CPC ......... G05F 1/567; G05F 3/222; G05F 3/225; G05F 3/242; G05F 3/245

USPC .................................................. 327/512, 513
See application file for complete search history.

(56) References Cited

U.S. PATENT DOCUMENTS

| | | | | |
|---|---|---|---|---|
| 5,862,170 A | * | 1/1999 | Britton et al. ................. | 374/183 |
| 8,136,983 B2 | * | 3/2012 | Razzaghi ....................... | 374/103 |
| 8,628,240 B2 | * | 1/2014 | Tustaniwskyj et al. ........ | 374/178 |

* cited by examiner

*Primary Examiner* — Jeffrey Zweizig
(74) *Attorney, Agent, or Firm* — Blakely Sokoloff Taylor & Zafman LLP (57) ABSTRACT

A device includes an over-temperature protection circuit configured to protect against over-temperature. The over-temperature protection circuit is coupled to receive a signal representative of temperature at the temperature sensor. The over-temperature protection circuit is coupled to adjust a temperature at which over-temperature protection is triggered based at least in part on a rate of change of the temperature at the temperature sensor.

18 Claims, 6 Drawing Sheets

OVER-TEMPERATURE PROTECTION OF SEMICONDUCTOR COMPONENTS

FIELD OF THE DISCLOSURE

The present invention relates generally to improving over-temperature protection of semiconductor components such as integrated circuits and discrete components.

BACKGROUND

There are a variety of different classes of temperature sensors available, including thermistors, resistance temperature detectors, thermocouples, and semiconductor-based temperature sensors.

Such temperature sensors can be used to monitor the temperature of one or more semiconductor components. For example, temperature sensors can be integrated directly into an integrated circuit, packaged in common with a monitored semiconductor component (e.g., in a multi-chip module), or disposed in the vicinity of one or more monitored semiconductor components.

Such monitoring can be used for over-temperature protection. Over-temperature protection seeks to protect one or more semiconductor components from heating to an undesirable temperature. In some cases, the overheating can impair operation or cause failure of the monitored semiconductor component(s). High temperature may also be indicative of problems with monitored semiconductor components, such as defects or damage that lead to heat production. In some instances, over-temperature protection of semiconductor components is designed to prevent temperatures of silicon-based semiconductor components from rising above a temperature in the range of 100-175 degrees Celsius (e.g., above 125 degrees Celsius). Over-temperature protection of semiconductor components based on other materials can be designed to prevent temperatures from rising above other temperatures.

Once over-temperature is detected, semiconductor components can be protected against damage in a number of different ways. For example, the supply of power to a semiconductor component can be cut off, e.g., by shutting down a section or the entirety of a device that includes the semiconductor component. As another example, a semiconductor component or the whole or a portion of a device that includes the semiconductor component can be put into a stand-by state. As yet another example, an over-temperature alert signal can be asserted.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example," "an example," "one implementation," or "an implementation" means that a particular feature, structure or characteristic described in connection with the embodiment or example is included in at least one embodiment of the present invention. Thus, appearances of the phrases "in one embodiment", "in an embodiment", "one example," "an example" "one implementation," or "an implementation" in various places throughout this specification are not necessarily all referring to the same embodiment, example, or implementation. Furthermore, the particular features, structures or characteristics may be combined in any suitable combinations and/or subcombinations in one or more embodiments, examples, or implementations. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
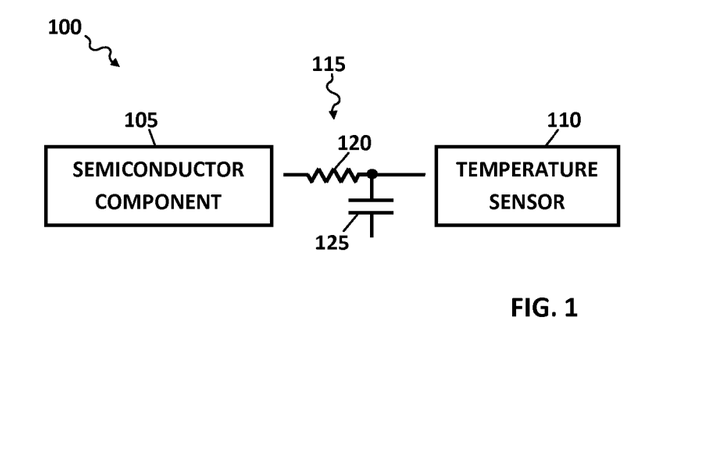
FIG. 1 is a schematic model of heat transfer from a semiconductor component to a temperature sensor, in accordance with the teachings of the present invention.

FIG. 1 is a schematic model of heat transfer from a semiconductor component 105 to a temperature sensor 110 within a system 100. Semiconductor component 105 and temperature sensor 110 are coupled by a heat transfer path 115. Heat transfer path 115 generally transfers heat by thermal conduction and can be modeled as including a dominant thermal resistor 120 and a dominant thermal capacitor 125 that together establish a thermal time constant τ for heat transfer from semiconductor component 105 to temperature sensor 110. Using this model, the Laplace transform of the transfer function is given by:

$$\frac{T_{SC}(s)}{T_{TS}(s)} = \frac{1}{1 + sR_\theta C_\theta} \qquad \text{(Equation 1)}$$

where $T_{SC}$ is the temperature of semiconductor component 105, $T_{TS}$ is the temperature of the temperature sensor 110, $R_\theta$ is the thermal resistance of thermal resistor 120, and $C_\theta$ is the thermal capacitance of thermal capacitor 125.

As can be seen, the temperature of temperature sensor 110 is not identical to the temperature of semiconductor component 105 except when the temperature of semiconductor component 105 does not change for relatively large periods of time or changes so slowly that sufficient time is allowed for changes in the temperature of semiconductor component 105 to propagate to temperature sensor 110.

During heating of semiconductor component 105, the difference between the temperature of semiconductor component 105 and the temperature of temperature sensor 110 can impair over-temperature protection of semiconductor component 105. In particular, semiconductor component 105 can heat relatively rapidly to an undesirable temperature before the temperature changes propagate to semiconductor component 105. The relatively rapid heating can in the meantime impair or even prevent appropriate operation of semiconductor component 105.

Relatively rapid heating is most likely to occur with power semiconductor components such as power diodes, high voltage power transistors (including, e.g., high voltage field effect transistors and insulated gate bipolar transistors), components made from wide bandgap materials, and the like. The currents conducted by power semiconductor components are often quite large. For example, power diodes may be rated to conduct average currents in excess of an ampere (e.g., three amperes or more) and included in a package designed for attachment to a heat sink. In high voltage power transistors, voltages in excess of 30 volts or more can be supported between a source and drain. The high voltages and currents of power semiconductor components can rapidly lead to heating to an undesirable temperature. Appropriate operation of power semiconductor components and/or other components working in conjunction with the power semiconductor components can be impaired or even prevented before over-temperature protection is triggered. In some instances, components may be harmed irreparably before over-temperature protection is triggered.

Figure 2:
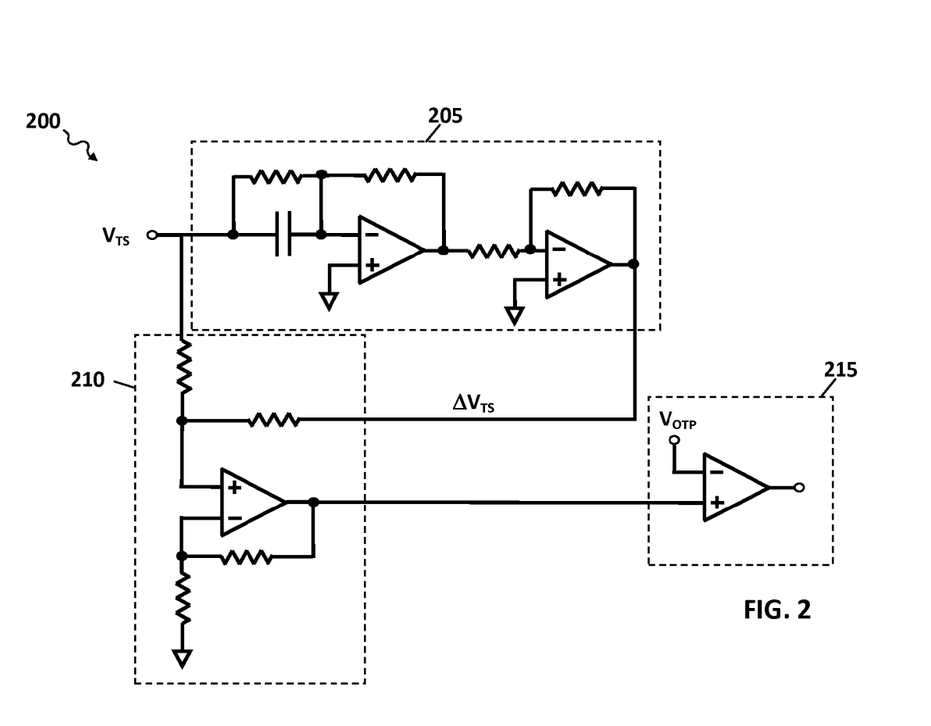
FIGS. 2-11 are over-temperature protection circuits that can be used to protect semiconductor components, in accordance with the teachings of the present invention.

FIG. 2 is an over-temperature protection circuit 200 that can be used to protect one or more semiconductor components, including power semiconductor components. Over-temperature protection circuit 200 includes a differentiator 205, a summer 210, and a comparator 215. Differentiator 205 is coupled to receive a signal $V_{TS}$ representative of the temperature of the temperature sensor and differentiate it to yield a signal $\Delta V_{TS}$ representative of the rate of change of the temperature of a temperature sensor. Summer 210 is coupled to generate a signal representative of the sum of signal $\Delta V_{TS}$ and signal $V_{TS}$. This adjusts the signal $V_{TS}$ representative of the temperature of the temperature sensor to account for the rate of heating. Comparator 215 is coupled to compare the signal representative of this sum to a threshold $V_{OTP}$ to determine whether over-temperature protection is warranted and, if warranted, trigger over-temperature protection.

By comparing threshold $V_{OTP}$ to the sum of signal $\Delta V_{TS}$ and signal $V_{TS}$, over-temperature protection against rapid heating can be improved. In particular, at relatively high rates of change of the temperature of the temperature sensor, sum of signal $\Delta V_{TS}$ and signal $V_{TS}$ will be relatively larger. In contrast, at relatively low rates of change of the temperature of the temperature sensor, the sum of signal $\Delta V_{TS}$ and signal $V_{TS}$ will be relatively smaller. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

In the illustrated implementation, differentiator 205 is implemented as an inverting differentiator in series with an inverter and summer 210 is implemented as a non-inverting summer. Other implementations are possible. For example, differentiator 205 can be implemented as an inverting differentiator and summer 210 can be implemented as a subtractor (i.e., a difference amplifier). As another example, differentiators that include inductive components can be used. As yet another example, rather than inverting the output of an inverting differentiator, signal $V_{TS}$ can be inverted, e.g., before being summed with the inverse of signal $\Delta V_{TS}$ in an inverting summer.

Figure 3:
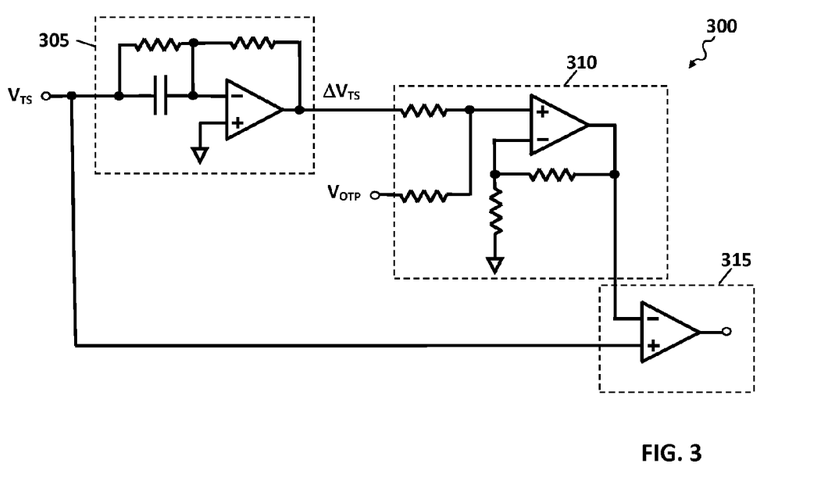

FIG. 3 is an over-temperature protection circuit 300 that can be used to protect one or more semiconductor components, including power semiconductor components. Over-temperature protection circuit 300 includes a differentiator 305, a summer 310, and a comparator 315. Differentiator 305 is coupled to receive a signal $V_{TS}$ representative of the temperature of the temperature sensor and differentiate it to yield a signal $-\Delta V_{TS}$ representative of the rate of change of the temperature of the temperature sensor. Summer 310 is coupled to generate a signal representative of the sum of signal $-\Delta V_{TS}$ and a threshold $V_{OTP}$. This adjusts the threshold $V_{OTP}$ to account for the rate of heating. Comparator 315 is coupled to compare the signal representative of this sum to signal $V_{TS}$ to determine whether over-temperature protection is warranted and, if warranted, trigger over-temperature protection.

By comparing signal $V_{TS}$ to the sum of signal $-\Delta V_{TS}$ and threshold $V_{OTP}$, over-temperature protection against rapid heating can be improved. In particular, at relatively high rates of change of the temperature of the temperature sensor, the sum of signal $-\Delta V_{TS}$ and threshold $V_{OTP}$ will be relatively smaller. In contrast, at relatively low rates of change of the temperature of the temperature sensor, the sum of signal $-\Delta V_{TS}$ and threshold $V_{OTP}$ will be relatively larger. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

In the illustrated implementation, differentiator 305 is implemented as an inverting differentiator and summer 310 is implemented as a non-inverting summer. Other implementations are possible. For example, differentiator 305 can be implemented as a non-inverting differentiator and summer 310 can be implemented as a subtractor (i.e., a difference amplifier). As another example, differentiators that include inductive components can be used.

Figure 4:
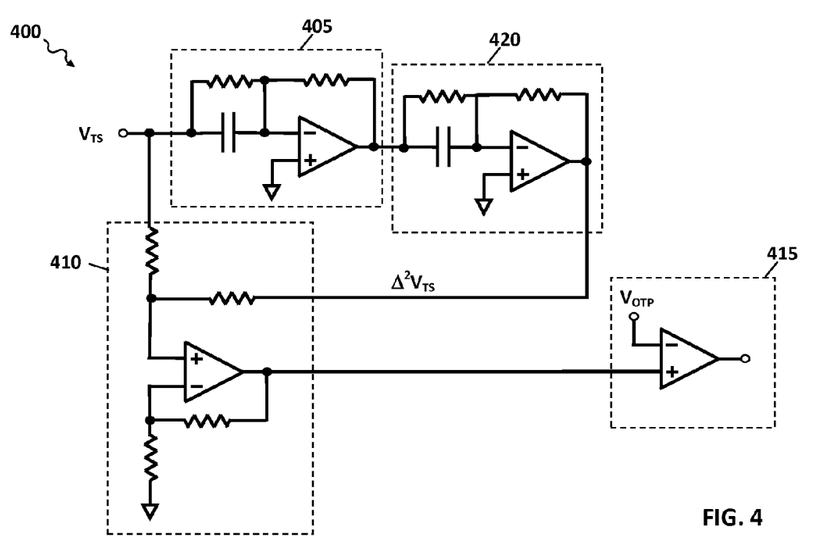

FIG. 4 is an over-temperature protection circuit 400 that can be used to protect one or more semiconductor components, including power semiconductor components. Over-temperature protection circuit 400 includes a first differentiator 405, a summer 410, a comparator 415, and a second differentiator 420. First differentiator 405 is coupled to receive a signal $V_{TS}$ representative of the temperature of the temperature sensor and differentiate it to yield a signal representative of the rate of change of $V_{TS}$. Second differentiator 420 is coupled to receive a signal representative of the rate of change of $V_{TS}$ from first differentiator 405 and differentiate it to yield a signal $\Delta^2 V_{TS}$ representative of the rate of change of the rate of change of the temperature of a temperature sensor. Summer 410 is coupled to generate a signal representative of the sum of signal $\Delta^2 V_{TS}$ and signal $V_{TS}$. This adjusts the signal $V_{TS}$ representative of the temperature of the temperature sensor to account for the rate of change in the rate of heating. Comparator 415 is coupled to compare the signal representative of this sum to a threshold $V_{OTP}$ to determine whether over-temperature protection is warranted and, if warranted, trigger over-temperature protection.

By comparing threshold $V_{OTP}$ to the sum of signal $\Delta^2 V_{TS}$ and signal $V_{TS}$, over-temperature protection against rapid heating can be improved. In particular, at relatively high rates of change in the rates of change of the temperature of the temperature sensor, the sum of signal $\Delta^2 V_{TS}$ and signal $V_{TS}$ will be relatively larger. In contrast, at relatively low rates of change of the rates of change of the temperature of the temperature sensor, the sum of signal $\Delta^2 V_{TS}$ and signal $V_{TS}$ will be relatively smaller. Thus, over-temperature protection will be triggered at relatively lower temperatures of the temperature sensor at relatively high rates of change of the rates of change of the temperature of the temperature sensor and at relatively higher temperatures of the temperature sensor at relatively low rates of change of the rates of change of the temperature of the temperature sensor.

In the illustrated implementation, differentiators 405, 420 are implemented as inverting differentiators in series and summer 210 is implemented as a non-inverting summer. Other implementations are possible. For example, differentiators 405, 420 can be implemented as non-inverting differentiators. As another example, differentiators that include inductive components can be used.

Figure 5:
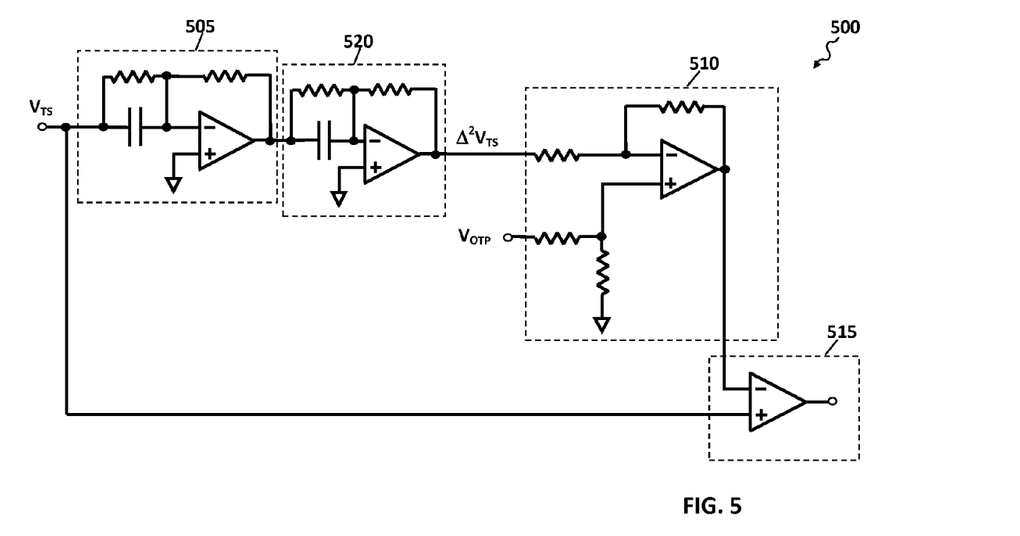

FIG. 5 is an over-temperature protection circuit 500 that can be used to protect one or more semiconductor components, including power semiconductor components. Over-temperature protection circuit 500 includes a first differentiator 505, a subtractor 510, a comparator 515, and a second differentiator 520. First differentiator 505 is coupled to receive a signal $V_{TS}$ representative of the temperature of the temperature sensor and differentiate it to yield a signal representative of the rate of change of $V_{TS}$. Second differentiator 520 is coupled to receive a signal representative of the rate of change of $V_{TS}$ from first differentiator 505 and differentiate it to yield a signal $\Delta^2 V_{TS}$ representative of the rate of change of the rate of change of the temperature of a temperature sensor. Subtractor 510 is coupled to generate a signal representative of the difference between signal $\Delta^2 V_{TS}$ and a threshold $V_{OTP}$. This adjusts the threshold $V_{OTP}$ to account for the rate of change in the rate of heating. Comparator 515 is coupled to compare the signal representative of this sum to signal $V_{TS}$ to determine whether over-temperature protection is warranted and, if warranted, trigger over-temperature protection.

By comparing signal $V_{TS}$ to the difference between signal $\Delta^2 V_{TS}$ and threshold $V_{OTP}$, over-temperature protection against rapid heating can be improved. In particular, at relatively high rates of change in the rates of change of the temperature of the temperature sensor, the difference between $\Delta^2 V_{TS}$ and threshold $V_{OTP}$ will be relatively smaller. In contrast, at relatively low rates of change in the rates of change of the temperature of the temperature sensor, the difference between signal $\Delta^2 V_{TS}$ and threshold $V_{OTP}$ will be relatively larger. Thus, over-temperature protection will be triggered at relatively lower temperatures of the temperature sensor at relatively high rates of change in the rates of change of the temperature of the temperature sensor and at relatively higher temperatures of the temperature sensor at relatively low rates of change in the rates of change of the temperature of the temperature sensor.

In the illustrated implementation, differentiators 505, 520 are implemented as inverting differentiators in series. Other implementations are possible. For example, differentiators 505, 520 can be implemented as non-inverting differentiators. The output of differentiator 520 can be inverted and subtractor 510 can be implemented as a summer. As another example, differentiators that include inductive components can be used.

In FIGS. 2-5, the signals can be weighted appropriately, e.g., by changing the values of the illustrated resistors and/or capacitors (and possible inductors) to obtain the improved over-temperature protection. Also, a single signal (i.e., +/−signal $\Delta V_{TS}$ or +/−signal $\Delta^2 V_{TS}$) is added to or subtracted from either the threshold $V_{OTP}$ or the signal $V_{TS}$ representative of the temperature of the temperature sensor. In other implementations, multiple signals (e.g., +/−signal $\Delta V_{TS}$ and +/−signal $\Delta^2 V_{TS}$) can be added to or subtracted from either the threshold $V_{OTP}$ or the signal $V_{TS}$ representative of the temperature of the temperature sensor. These signals can also be weighted appropriately, e.g., by changing the values of the illustrated resistors and/or capacitors (and possible inductors).

In general, the appropriate weightings will be a function of several factors including, e.g., the geometry and the arrangement of the components within a system and the materials from which those components are made. Further, some systems may be designed to operate in a variety of different operational settings, such as with or without a heat sink and/or with or without active cooling.

In some implementations, the weightings or other operational characteristics of an over-temperature protection circuit can be changed using one or more configuration elements. For example, configuration elements can allow the adjustment that is made responsive to the rate of change of the temperature of the temperature sensor and/or the rate of change of the rate of change of this temperature to be adjusted. Some configuration elements need not be removed from an over-temperature protection circuit for the adjustments to occur. In the context of analog over-temperature protection circuits, examples of such configuration elements include trimmable resistors, capacitors, and/or inductors. Other configuration elements are disposed to be easily removable from an over-temperature protection circuit and replaceable. Examples of such configuration elements in analog over-temperature protection integrated circuits include fuses, resistors, capacitors, and/or inductors that are connected to selected pins on an integrated circuit. For example, connection of different resistance resistors to a pin on an integrated circuit can be used to select the adjustment made responsive to the rate of change of the temperature of the temperature sensor.

In some implementations, configuration elements may be useable to select a particular operational characteristic from amongst a collection of predetermined operational characteristics. For example, in some implementations, a first adjustment responsive to the rate of change of temperature may be appropriate for over-temperature protection of a semiconductor component when it is coupled to a heat sink, whereas a second adjustment responsive to the rate of change of the temperature may be appropriate for over-temperature protection of the same semiconductor component when it is not coupled to a heat sink. As another example, the presence or absence of active cooling (with or without a heat sink) can also lead to different appropriate adjustments responsive to the rate of change of temperature.

In some implementations, an over-temperature protection circuit can include memory that stores a collection of predetermined operational characteristics as well as selection logic for selecting a particular operational characteristic from the collection. For example, the selection logic can act responsive to one or more configuration elements to select the appropriate operational characteristic for implementation.

In many instances of over-temperature protection of semiconductor components, the rates of change of the temperature of temperature sensors and the rates of change in these rates of change are relatively low. In other words, the thermal time constants for heat transfer from a semiconductor component to a temperature sensor can be relatively large. As a practical matter, it may be difficult or costly to incorporate resistances and capacitances that are sufficiently large to be suited for weighting the signals appropriately in real world systems.

Indeed, the resistances and capacitances may be so large that practical implementations within an integrated circuit, i.e., without large external discrete components, are very difficult to implement. Further, alternative designs based on storage of analog signals may require storage elements (e.g., capacitors) with low leakages and/or low leakage tolerances that are comparably difficult to implement.

Figure 6:
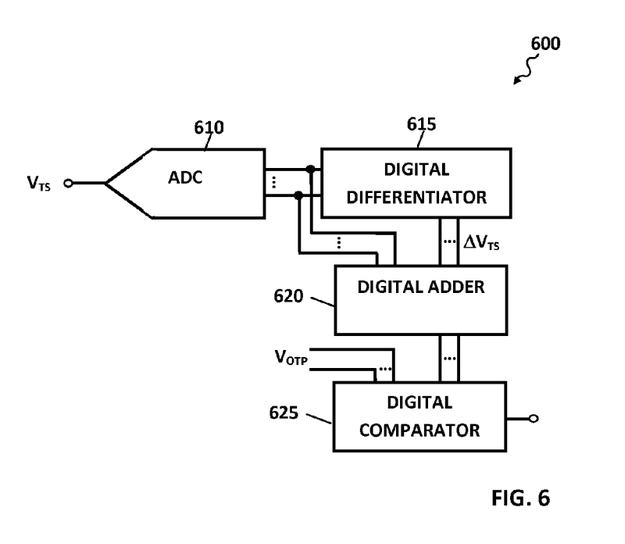

FIG. 6 is a digital over-temperature protection circuit 600 that can be used to protect one or more semiconductor components, including power semiconductor components. Over-temperature protection circuit 600 includes an analog-to-digital converter 610, a digital "differentiator" 615, a digital adder 620, and a digital comparator 625. Over-temperature protection circuit 600 also includes one or more timing couplings that coordinate the operation of elements 610, 615, 620, 625 of over-temperature protection circuit 600. Such timing couplings can be used, e.g., to trigger analog to digital conversion by analog-to-digital converter 610, computation of a signal $\Delta V_{TS}$ representative of the rate of change of the temperature of a temperature sensor by digital "differentiator" 615, addition by digital adder 620, and/or comparison by digital comparator 625. Such timing couplings can couple elements 610, 615, 620, 625 to each other and/or to external timing elements. By using appropriate timing and/or digital weighting operations—rather than resistors, capacitors, and/or inductors—practical implementations where the rates of change of the temperature of temperature sensors are relatively low can be achieved.

Analog-to-digital converter 610 is coupled to receive a signal $V_{TS}$ representative of the temperature of the temperature sensor and to generate digital signals representative of the temperature of the temperature sensor at different times, responsive to a timing signal. For example, in some implementations, analog-to-digital converter 610 is coupled to digitize signal $V_{TS}$ every 0.5 to every two seconds, e.g., approximately every second. Digital "differentiator" 615 is coupled to receive digital signals representative of the temperature of the temperature sensor and generate a digital signal $\Delta V_{TS}$ representative of the rate of change of the temperature of a temperature sensor.

Please note that the binary digital "differentiators" in FIGS. 6-9 do not compute an instantaneous rate of change of the temperature of a temperature sensor in the same way that analog differentiators in FIGS. 2-5 differentiate. Rather, digital "differentiators" merely computes a change in signal $V_{TS}$ over a real period of time to generate a digital signal $\Delta V_{TS}$ representative of the rate of change of the temperature of a temperature sensor.

Digital adder 620 is coupled to generate a signal representative of the sum of digital signal $\Delta V_{TS}$ and a digital signal representative of the temperature of the temperature sensor. This adjusts the digital signals representative of the temperature of the temperature sensor to account for the rate of heating. Digital comparator 625 is coupled to compare the digital signal representative of this sum to a digital threshold $V_{OTP}$ to determine whether over-temperature protection is warranted and, if warranted, trigger over-temperature protection.

By comparing digital threshold $V_{OTP}$ to the sum of digital signal $\Delta V_{TS}$ and a digital signal representative of the temperature of the temperature sensor, over-temperature protection against rapid heating can be improved. In particular, at relatively high rates of change of the temperature of the temperature sensor, sum of will be relatively larger. In contrast, at relatively low rates of change of the temperature of the temperature sensor, the sum will be relatively smaller. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

Other implementations are possible. For example, over-temperature protection circuit 600 also can include one or more registers or other storage elements, e.g., to store analog or digitized samples of signal $V_{TS}$ and/or digital signals $\Delta V_{TS}$ representative of the rate of change of the temperature of a temperature sensor. Such storage elements can be, e.g., internal to the illustrated elements of over-temperature protection circuit 600 or external. As another example, in some implementation, a pair of analog-to-digital converters can be used.

Figure 7:
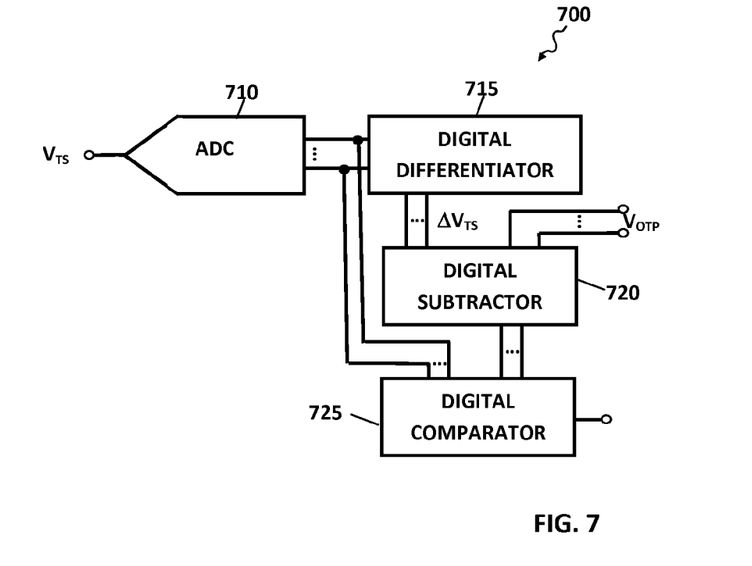

FIG. 7 is a digital over-temperature protection circuit 700 that can be used to protect one or more semiconductor components, including power semiconductor components. Over-temperature protection circuit 700 includes an analog-to-digital converter 710, a digital "differentiator" 715, a digital subtractor 720, and a digital comparator 725. Over-temperature protection circuit 700 also includes one or more timing couplings that coordinate the operation of elements 710, 715, 720, 725 of over-temperature protection circuit 700. Such timing couplings can be used, e.g., to trigger analog to digital conversion by analog-to-digital converter 710, computation of a signal $\Delta V_{TS}$ representative of the rate of change of the temperature of a temperature sensor by digital "differentiator" 715, addition by digital adder 720, and/or comparison by digital comparator 725. Such timing couplings can couple elements 710, 715, 720, 725 to each other and/or to external timing elements. By using appropriate timing and/or digital weighting operations—rather than resistors, capacitors, and/or inductors—practical implementations where the rates of change of the temperature of temperature sensors are relatively low can be achieved.

Analog-to-digital converter 710 is coupled to receive a signal $V_{TS}$ representative of the temperature of the temperature sensor and generate digital signals representative of the temperature of the temperature sensor at different times. For example, in some implementations, analog-to-digital converter 710 is coupled to digitize signal $V_{TS}$ every 0.5 to every two seconds, e.g., approximately every second. Digital "differentiator" 715 is coupled to receive digital signals representative of the temperature of the temperature sensor and generate a digital signal $\Delta V_{TS}$ representative of the rate of change of the temperature of a temperature sensor.

Digital subtractor 720 is coupled to generate a signal representative of the difference between digital threshold $V_{OTP}$ and digital signal $\Delta V_{TS}$. This adjusts the digital threshold $V_{OTP}$ to account for the rate of heating. Digital comparator 725 is coupled to compare the digital signal representative of this difference to a digital signal representative of the temperature of the temperature sensor to determine whether over-temperature protection is warranted and, if warranted, trigger over-temperature protection.

By comparing a digital signal representative of the temperature of the temperature sensor to the difference between digital threshold $V_{OTP}$ and digital signal $\Delta V_{TS}$, over-temperature protection against rapid heating can be improved. In particular, at relatively high rates of change of the temperature of the temperature sensor, difference of will be relatively smaller. In contrast, at relatively low rates of change of the temperature of the temperature sensor, the difference will be relatively larger. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

Other implementations are possible. For example, over-temperature protection circuit 700 also can include one or more registers or other digital storage elements, e.g., to store analog or digitized samples of signal $V_{TS}$ and/or digital signals $\Delta V_{TS}$ representative of the rate of change of the temperature of a temperature sensor. Such storage elements can be, e.g., internal to the illustrated elements of over-temperature protection circuit 700 or external. As another example, in some implementation, a pair of analog-to-digital converters can be used.

Figure 8:
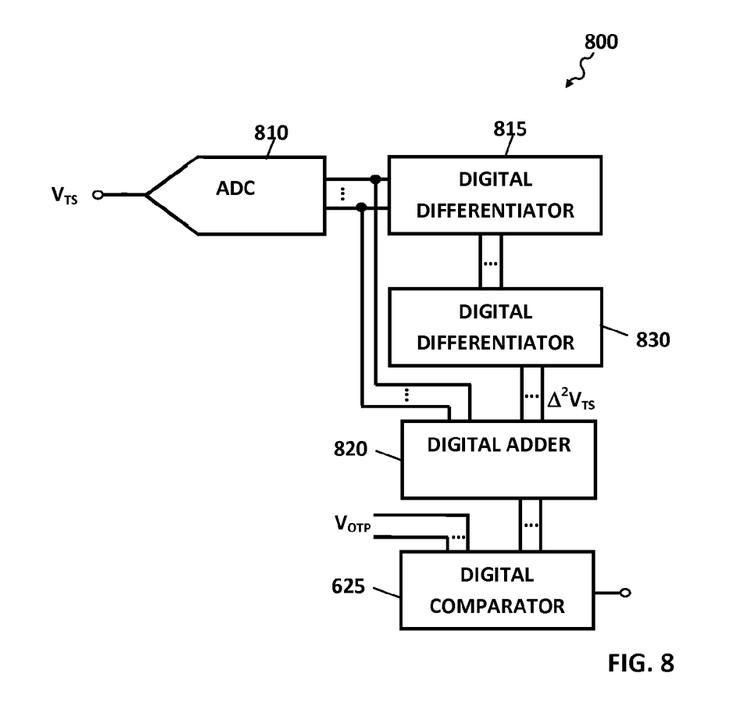

FIG. 8 is a digital over-temperature protection circuit 800 that can be used to protect one or more semiconductor components, including power semiconductor components. Over-temperature protection circuit 800 includes an analog-to-digital converter 810, a first digital "differentiator" 815, a second digital "differentiator" 830, a digital adder 820, and a digital comparator 825. Over-temperature protection circuit 800 also includes one or more timing couplings that coordinate the operation of elements 810, 815, 820, 825, 830 of over-temperature protection circuit 800. Such timing couplings can be used, e.g., to trigger analog to digital conversion by analog-to-digital converter 810, computation by digital "differentiators" 815, 830, addition by digital adder 820, and/or comparison by digital comparator 825. Such timing couplings can couple elements 810, 815, 820, 825 to each other and/or to external timing elements. By using appropriate timing and/or digital weighting operations—rather than resistors, capacitors, and/or inductors—practical implementations where the rates of change of the temperature of temperature sensors are relatively low can be achieved.

Analog-to-digital converter 810 is coupled to receive a signal $V_{TS}$ representative of the temperature of the temperature sensor and generate digital signals representative of the temperature of the temperature sensor at different times. For example, in some implementations, analog-to-digital converter 810 is coupled to digitize signal $V_{TS}$ every 0.5 to every two seconds, e.g., approximately every second. First digital "differentiator" 815 is coupled to receive digital signals representative of the temperature of the temperature sensor and generate a digital signal representative of the rate of change of the temperature of a temperature sensor. Second digital "differentiator" 830 is coupled to receive a digital signal representative of the rate of change of the temperature of a temperature sensor and generate a digital signal $\Delta^2 V_{TS}$ representative of the rate of change in the rate of change of the temperature of that temperature sensor.

Digital adder 820 is coupled to generate a signal representative of the sum of digital signal $\Delta^2 V_{TS}$ and a digital signal representative of the temperature of the temperature sensor. This adjusts the digital signals representative of the temperature of the temperature sensor to account for the rate of change in the rate of heating. Digital comparator 825 is coupled to compare the digital signal representative of this sum to a digital threshold $V_{OTP}$ to determine whether over-temperature protection is warranted and, if warranted, trigger over-temperature protection.

By comparing digital threshold $V_{OTP}$ to the sum of digital signal $\Delta^2 V_{TS}$ and a digital signal representative of the temperature of the temperature sensor, over-temperature protection against rapid heating can be improved. In particular, at relatively high rates of change of the temperature of the temperature sensor, sum of will be relatively larger. In contrast, at relatively low rates of change of the temperature of the temperature sensor, the sum will be relatively smaller. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

Other implementations are possible. For example, over-temperature protection circuit 800 also can include one or more registers or other digital storage elements, e.g., to store analog or digitized samples of signal $V_{TS}$, digital signals representative of the rate of change of the temperature of a temperature sensor, and/or digital signal $\Delta^2 V_{TS}$ representative of the rate of change in the rate of change of the temperature of that temperature sensor. Such storage elements can be, e.g., internal to the illustrated elements of over-temperature protection circuit 800 or external. As another example, in some implementation, a pair of analog-to-digital converters can be used.

Figure 9:
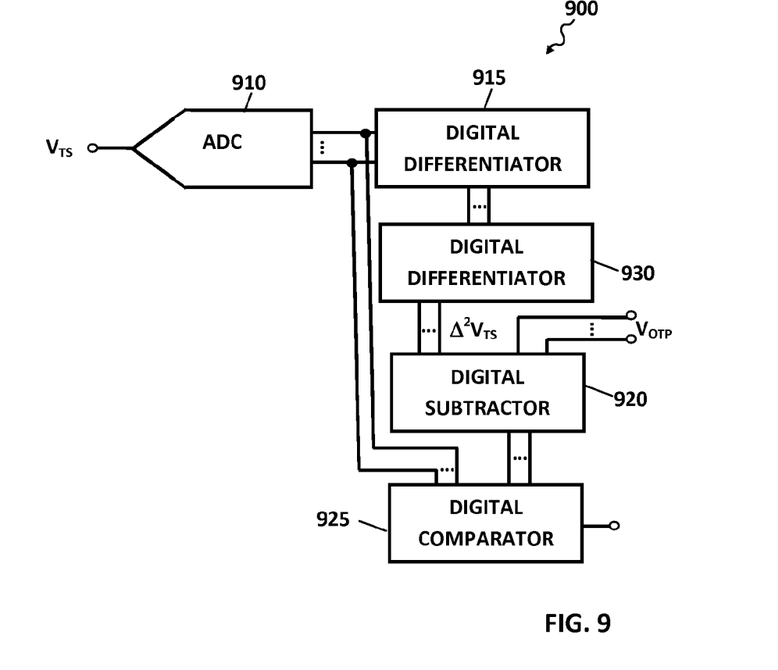

FIG. 9 is a digital over-temperature protection circuit 900 that can be used to protect one or more semiconductor components, including power semiconductor components. Over-temperature protection circuit 900 includes an analog-to-digital converter 910, a first digital "differentiator" 915, a second digital "differentiator" 930, a digital subtractor 920, and a digital comparator 925. Over-temperature protection circuit 900 also includes one or more timing couplings that coordinate the operation of elements 910, 915, 920, 925, 930 of over-temperature protection circuit 900. Such timing couplings can be used, e.g., to trigger analog to digital conversion by analog-to-digital converter 910, computation by digital "differentiators" 915, 930, addition by digital adder 920, and/or comparison by digital comparator 925. Such timing couplings can couple elements 910, 915, 920, 925, 930 to each other and/or to external timing elements. By using appropriate timing and/or digital weighting operations—rather than resistors, capacitors, and/or inductors—practical implementations where the rates of change of the temperature of temperature sensors are relatively low can be achieved.

Analog-to-digital converter 910 is coupled to receive a signal $V_{TS}$ representative of the temperature of the temperature sensor and to generate digital signals representative of the temperature of the temperature sensor at different times. For example, in some implementations, analog-to-digital converter 910 is coupled to digitize signal $V_{TS}$ every 0.5 to every two seconds, e.g., approximately every second. First digital "differentiator" 915 is coupled to receive digital signals representative of the temperature of the temperature sensor and generate a digital signal representative of the rate of change of the temperature of a temperature sensor. Second digital "differentiator" 930 is coupled to receive a digital signal representative of the rate of change of the temperature of a temperature sensor and generate a digital signal $\Delta^2 V_{TS}$ representative of the rate of change in the rate of change of the temperature of that temperature sensor.

Digital subtractor 920 is coupled to generate a signal representative of the difference between digital threshold $V_{OTP}$ and digital signal $\Delta^2 V_{TS}$. This adjusts the digital threshold $V_{OTP}$ to account for the rate of heating. Digital comparator 925 is coupled to compare the digital signal representative of this difference to a digital signal representative of the temperature of the temperature sensor to determine whether over-temperature protection is warranted and, if warranted, trigger over-temperature protection.

By comparing a digital signal representative of the temperature of the temperature sensor to the difference between digital threshold $V_{OTP}$ and digital signal $\Delta^2 V_{TS}$, over-temperature protection against rapid heating can be improved. In particular, at relatively high rates of change of the temperature of the temperature sensor, difference of will be relatively smaller. In contrast, at relatively low rates of change of the temperature of the temperature sensor, the difference will be relatively larger. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

Other implementations are possible. For example, over-temperature protection circuit 900 also can include one or more registers or other digital storage elements, e.g., to store analog or digitized samples of signal $V_{TS}$, digital signals representative of the rate of change of the temperature of a temperature sensor, and/or digital signal $\Delta^2 V_{TS}$ representative of the rate of change in the rate of change of the temperature of that temperature sensor. Such storage elements can be, e.g., internal to the illustrated elements of over-temperature protection circuit 900 or external. As another example, in some implementation, a pair of analog-to-digital converters can be used.

In FIGS. 6-9, the signals can be weighted appropriately, e.g., by using digital weighting operations and/or adjusting the timing of events such as analog to digital conversion. Also, a single signal (i.e., digital signal $\Delta^2 V_{TS}$ or digital signal $\Delta V_{TS}$) is added to or subtracted from either the digital threshold $V_{OTP}$ or the digital signal $V_{TS}$ representative of the temperature of the temperature sensor. In some implementations, multiple signals (e.g., +/−signal $\Delta^2 V_{TS}$ and +/−signal $\Delta V_{TS}$) can added to or subtracted from either the threshold $V_{OTP}$ or the signal $V_{TS}$ representative of the temperature of the temperature sensor. These signals can also be weighted appropriately, e.g., using digital weighting operations and/or adjusting the timing of events.

As with analog over-protection circuits, the appropriate weightings and/or timing will be a function of several factors and some systems may be designed to operate in a variety of different operational settings. In some implementations, the weightings and/or timing of digital over-temperature protection circuits can be changed using one or more configuration elements. In the context of digital over-temperature protection circuits, one example of such a configuration element includes a writeable memory that can be written to by a user to achieve the desired weightings and/or timing. Another example of such a configuration element is a look-up-table that stores two or more different weighting and/or timing options that are accessed, e.g., in accordance with input received a user via a control pin on an integrated circuit.

Figure 10:
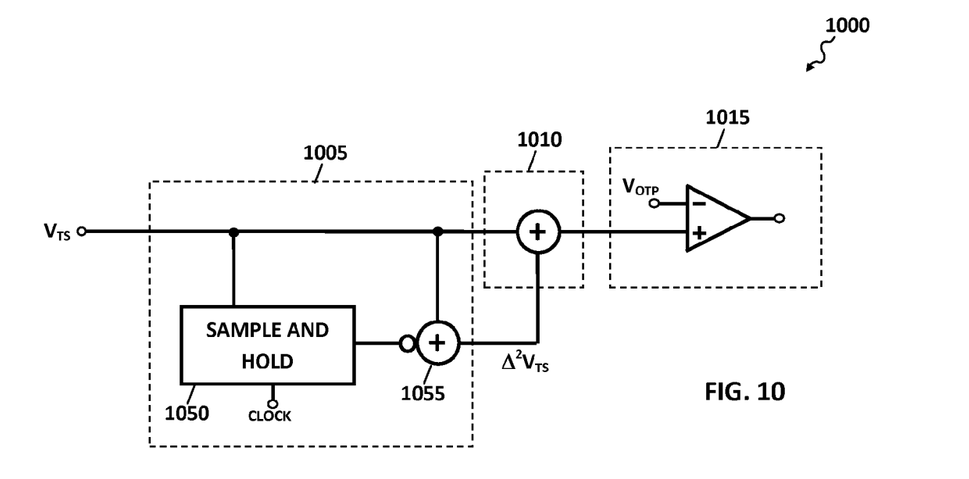

FIG. 10 shows an over-temperature protection circuit 1000 that can be used to protect one or more semiconductor components, including power semiconductor components. Over-temperature protection circuit 1000 can be implemented in analog and/or digital circuitry. Over-temperature protection circuit 1000 includes a differentiator 1005, a summer/adder 1010, and a comparator 1015. Differentiator 1005 is coupled to receive a signal $V_{TS}$ representative of the temperature of the temperature sensor and differentiate it to yield a signal $\Delta V_{TS}$ representative of the rate of change of the temperature of a temperature sensor. Summer/adder 1010 is coupled to generate a signal representative of the sum of signal $\Delta V_{TS}$ and signal $V_{TS}$. This adjusts the signal $V_{TS}$ representative of the temperature of the temperature sensor to account for the rate of heating. Comparator 1015 is coupled to compare the signal representative of this sum to a threshold $V_{OTP}$ to determine whether over-temperature protection is warranted and, if warranted, trigger over-temperature protection.

In the illustrated implementation, differentiator 1005 is implemented using a sample and hold 1050 and a second summer/adder 1055. In particular, sample and hold 1050 samples the signal $V_{TS}$ representative of the temperature of the temperature sensor responsive to a clock signal CLOCK. Second summer/adder 1055 adds the inverse of this sample (i.e., subtracts this sample) from signal $V_{TS}$. Signal $\Delta V_{TS}$ representative of the rate of change of the temperature results.

In some implementations, second summer/adder 1055 can operate continuously and will produce a signal $\Delta V_{TS}$ that rises and/or falls with the same slope as signal $V_{TS}$ between sampling events. However, when sampling occurs and the output of sample and hold 1050 is nearly equal to signal $V_{TS}$, then signal $\Delta V_{TS}$ will return to a level near zero. Signal $\Delta V_{TS}$ will then rise and/or fall from this level until the next sampling event.

By comparing threshold $V_{OTP}$ to the sum of signal $\Delta V_{TS}$ and signal $V_{TS}$, over-temperature protection against rapid heating can be improved. In particular, at relatively high rates of change of the temperature of the temperature sensor, sum of signal $\Delta V_{TS}$ and signal $V_{TS}$ will be relatively larger. In contrast, at relatively low rates of change of the temperature of the temperature sensor, the sum of signal $\Delta V_{TS}$ and signal $V_{TS}$ will be relatively smaller. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

Figure 11:
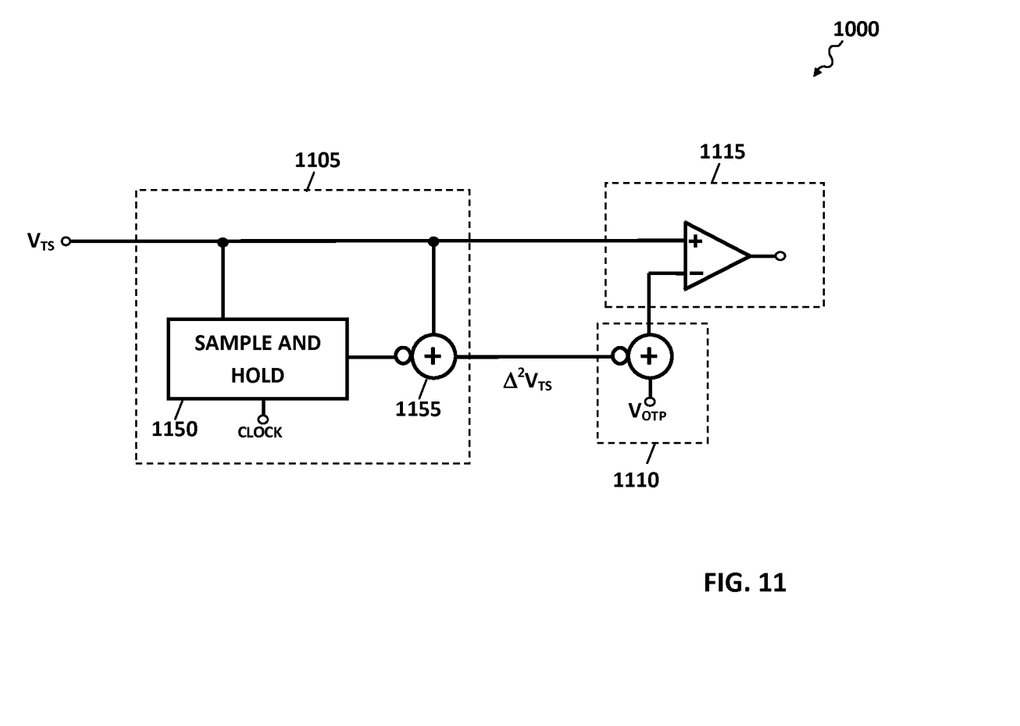

FIG. 11 is an over-temperature protection circuit 1100 that can be used to protect one or more semiconductor components, including power semiconductor components. Over-temperature protection circuit 1100 can be implemented in analog and/or digital circuitry. Over-temperature protection circuit 1100 includes a differentiator 1105, a summer/adder 1110, and a comparator 1115. Differentiator 1105 is coupled to receive a signal $V_{TS}$ representative of the temperature of the temperature sensor and differentiate it to yield a signal $-\Delta V_{TS}$ representative of the rate of change of the temperature of the temperature sensor. Summer 1110 is coupled to generate a signal representative of the difference between signal $-\Delta V_{TS}$ and a threshold $V_{OTP}$. This adjusts the threshold $V_{OTP}$ to account for the rate of heating. Comparator 1115 is coupled to compare the signal representative of this sum to signal $V_{TS}$ to determine whether over-temperature protection is warranted and, if warranted, trigger over-temperature protection.

In the illustrated implementation, differentiator 1105 is implemented using a sample and hold 1150 and a second summer/adder 1155. In particular, sample and hold 1150 samples the signal $V_{TS}$ representative of the temperature of the temperature sensor responsive to a clock signal CLOCK. Second summer/adder 1155 adds the inverse of this sample (i.e., subtracts this sample) from signal $V_{TS}$. Signal $\Delta V_{TS}$ representative of the rate of change of the temperature results.

In some implementations, second summer/adder 1155 can operate continuously and will produce a signal $\Delta V_{TS}$ that rises and/or falls with the same slope as signal $V_{TS}$ between sampling events. However, when sampling occurs and the output of sample and hold 1150 is nearly equal to signal $V_{TS}$, then signal $\Delta V_{TS}$ will return to a level near zero. Signal $\Delta V_{TS}$ will then rise and/or fall from this level until the next sampling event.

By comparing signal $V_{TS}$ to the difference between signal $\Delta V_{TS}$ and threshold $V_{OTP}$, over-temperature protection against rapid heating can be improved. In particular, at relatively high rates of change of the temperature of the temperature sensor, the sum of signal $-\Delta V_{TS}$ and threshold $V_{OTP}$ will be relatively smaller. In contrast, at relatively low rates of change of the temperature of the temperature sensor, the sum of signal $-\Delta V_{TS}$ and threshold $V_{OTP}$ will be relatively larger. Thus, over-temperature protection will be triggered at relatively lower temperatures of the temperature sensor at relatively high rates of change of the temperature of the temperature sensor and at relatively higher temperatures of the temperature sensor at relatively low rates of change of the temperature of the temperature sensor.

In the above-described analog implementations, thresholds and signals representative of the temperature of the temperature sensor are adjusted on a continuous scale, i.e., by amounts that scale to the time of rate of change of the temperature of the temperature sensor or by amounts that scale to the time of rate of change in the rate of change of the temperature of the temperature sensor. In the above-described digital implementations, although the scale of the adjustment is not strictly speaking continuous (i.e., digitization results in discrete digital adjustment values), the adjustments are quasi-continuous in that they scale to the time of rate of change of the temperature of the temperature sensor or to the time of rate of change in the rate of change of the temperature of the temperature sensor within the resolution of the digital values.

Other implementations are possible. For example, in some implementations, analog or digital classification logic can be used to classify the rate of change of the temperature of the temperature sensor and/or the rate of change in the rate of change of the temperature of the temperature sensor into different classes. A selection from a collection of discrete adjustments amounts can then be made according to that classification. The discrete adjustments amounts can be stored, e.g., in a memory device.

The particular adjustment amounts are dependent upon, e.g., the arrangement and composition of the semiconductor component, temperature sensor, and heat transfer path. The particular adjustment amounts can be determined, e.g., using the model of system 100 (FIG. 1) or other model that provides a more detailed model of heat transfer with a system.

In one implementation that adjusts either a threshold or a signal representative of the temperature of the temperature sensor by discrete adjustment amounts, the following classifications can be used to adjust the temperature at which over-temperature protection is triggered.

TABLE 1

| $\Delta V_{TS}$ | Adjusted Over-Temperature Protection Trigger Temperature (as % of Unadjusted Trigger Temperature) |
|---|---|
| <2°/sec | 100 |
| 2-5°/sec | 90 |
| 5-10°/sec | 80 |

In some implementations, operations within over-temperature protection circuits can be timed to reduce the impact of noise on over-temperature protection. For example, sample and hold elements can be timed to sample out of sync with noise, as can analog-to-digital conversion. This may be especially important when power semiconductor components are protected against over-temperature since the conducted currents are often quite large. Examples of such noise include the noise resulting from switching of a power switch, e.g., one that switches the primary current in a switched mode power supply. For example, in some implementation, sampling and analog-to-digital conversion can be timed to occur while the gate of a power switch that switches the primary current in a switched mode power supply is off. Such switched mode power supplies can be used, e.g., in battery chargers and converters for LED lights. The timing can be achieved by coupling a signal representative of the state of the power switch into the over-temperature protection circuit.

The above description of illustrated examples of the present invention, including what is described in the Abstract, are not intended to be exhaustive or to be limitation to the precise forms disclosed. While specific embodiments of, examples for, or implementations of the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments, examples, or implementations in accordance with the teachings of the present invention.

What is claimed is:

1. An over-temperature protection circuit comprising:
    at least one differentiator coupled to generate a signal representative of a rate of change of a temperature at a temperature sensor;
    a memory storing data specifying a collection of predetermined operational characteristics;
    an adjuster coupled to adjust a trigger temperature at which over-temperature protection is triggered, the magnitude of the adjustment being based at least in part on the signal representative of the rate of change of the temperature and a selected first of the predetermined operational characteristics in the collection; and
    a comparator to generate a trigger signal that triggers over-temperature protection responsive to the temperature at the temperature sensor exceeding the adjusted trigger temperature.

2. The over-temperature protection circuit of claim 1, wherein the over-temperature protection circuit is implemented in a packaged integrated circuit and comprises selection logic to select the first of the predetermined operational characteristics in the collection in response to connection of a component to a pin of the integrated circuit package.

3. The over-temperature protection circuit of claim 1, wherein the over-temperature protection circuit is coupled to receive a signal indicative of timing of switching of a primary current by a power switch in a switched mode power supply and time operations based on the signal indicative of the timing of the switching of the primary current.

4. The over-temperature protection circuit of claim 3, wherein the over-temperature protection circuit is coupled to time sampling of the temperature at the temperature sensor by a sample and hold based on the signal indicative of the timing of the switching of the primary current.

5. The over-temperature protection circuit of claim 1, wherein the adjuster is coupled to adjust a trigger temperature by lowering a threshold against which the signal representative of the temperature at the temperature sensor is compared.

6. The over-temperature protection circuit of claim 1, wherein the adjuster is coupled to adjust the trigger temperature by adding a value to the signal representative of the temperature at the temperature sensor.

7. The over-temperature protection circuit of claim 1, wherein the adjuster is coupled to adjust the trigger temperature by discrete adjustments amounts, each discrete adjustment amount applicable to a range of values of the signal representative of the rate of change of the temperature.

8. The over-temperature protection circuit of claim 1, wherein the magnitude of the adjustment is based at least in part on both a rate of change in the temperature at the temperature sensor and a rate of change of the rate of change in the temperature at the temperature sensor.

9. A device comprising:
- a semiconductor component;
- a temperature sensor thermally coupled with the semiconductor component by a heat transfer path; and
- an over-temperature protection circuit configured to protect against over-temperature, the over-temperature protection circuit coupled to receive a signal representative of temperature at the temperature sensor and further coupled to adjust a temperature at which over-temperature protection is triggered in response to at least one of:
  a) a first rate of change in the temperature at the temperature sensor,
  b) a second rate of change of the first rate of change of the temperature at the temperature sensor, or
  c) the first rate of change and the second rate of change.

10. The device of claim 9, wherein the over-temperature protection circuit is coupled to adjust the temperature by discrete adjustments amounts, each amount applicable to a range of values of the temperature at the temperature sensor.

11. The device of claim 9, wherein the over-temperature protection circuit is coupled to receive a signal indicative of timing of switching of a primary current by a power switch in a switched mode power supply and time sampling of the signal representative of temperature at the temperature sensor based on the signal indicative of the timing of the switching of the primary current.

12. The device of claim 11, wherein the digital over-temperature protection circuit is coupled to time the sampling by a sample and hold to occur while the power switch does not conduct the primary current.

13. The device of claim 9, further comprising:
- a memory storing data specifying a collection of predetermined operational characteristics; and
- selection logic to select a first of the predetermined operational characteristics in the collection,
- wherein a magnitude of the adjustment of the temperature by the over-temperature protection circuit is responsive to the selection of the first of the predetermined operational characteristics.

14. A device comprising:
- a switched mode power supply having a power switch to switch a primary current;
- a temperature sensor coupled to output a signal representative of temperature at the temperature sensor; and
- an over-temperature protection circuit coupled to
  receive a signal indicative of the timing of the switching of the primary current by the power switch,
  time, based on the signal indicative of the timing of the switching of the primary current, at least part of a determination of one or more values representative of a rate of change in the temperature at the temperature sensor from the signal representative of temperature at the temperature sensor, and
  adjust a temperature at which at which over-temperature protection is triggered responsive to the determined one or more values.

15. The device of claim 14, wherein the over-temperature protection circuit is coupled to time sampling of the temperature at the temperature sensor by a sample and hold to occur while the power switch does not conduct the primary current.

16. The device of claim 14, wherein the over-temperature protection circuit is coupled to adjust the temperature by discrete adjustments amounts, each amount applicable to a range of values of the temperature at the temperature sensor.

17. The device of claim 14, wherein the device is a battery charger.

18. The device of claim 14, further comprising:
- a memory storing data specifying a collection of predetermined operational characteristics; and
- selection logic to select a first of the predetermined operational characteristics in the collection,
- wherein a magnitude of the adjustment of the temperature by the over-temperature protection circuit is responsive to the selection of the first of the predetermined operational characteristics.

* * * * *